(12) United States Patent
Steele et al.

(10) Patent No.: US 10,894,533 B2
(45) Date of Patent: Jan. 19, 2021

(54) WHEEL TORQUE SENSOR FOR HIGHLY AUTOMATED DRIVING VEHICLES

(71) Applicant: Robert Bosch GmbH, Stuttgart (DE)

(72) Inventors: Samuel Steele, Ypsilanti, MI (US); Eduardo Herrera Lopez, South Lyon, MI (US); Kevin M. Danford, Ann Arbor, MI (US)

(73) Assignee: ROBERT BOSCH GMBH, Stuttgart (DE)

( * ) Notice: Subject to any disclaimer, the term of this patent is extended or adjusted under 35 U.S.C. 154(b) by 479 days.

(21) Appl. No.: 15/852,446

(22) Filed: Dec. 22, 2017

(65) Prior Publication Data

US 2019/0193693 A1 Jun. 27, 2019

(51) Int. Cl.

| F16D 55/22 | (2006.01) |
|---|---|
| F16D 65/14 | (2006.01) |
| B60T 8/172 | (2006.01) |
| B60T 8/52 | (2006.01) |
| G07C 5/08 | (2006.01) |
| G01L 5/16 | (2020.01) |
| F16D 66/00 | (2006.01) |
| F16D 65/18 | (2006.01) |

(52) U.S. Cl.
CPC .............. *B60T 8/1725* (2013.01); *B60T 8/52* (2013.01); *F16D 65/18* (2013.01); *F16D 66/00* (2013.01); *G01L 5/16* (2013.01); *G07C 5/085* (2013.01); *B60G 2204/113* (2013.01); *B60G 2400/42* (2013.01); *B60G 2401/174* (2013.01); *F16D 2066/005* (2013.01)

(58) Field of Classification Search
CPC ...... F16D 65/0006; F16D 65/18; B60T 11/18; B60T 11/30
USPC .......... 188/71.1, 71.3, 72.1–72.5, 73.1, 73.2, 188/73.39, 73.41–73.47, 181 T, 369, 370
See application file for complete search history.

(56) References Cited

U.S. PATENT DOCUMENTS

| 3,487,896 A | * | 1/1970 | Becker ..................... B60T 11/30 188/152 |
| 4,799,575 A | * | 1/1989 | Kroniger ................. B60T 11/18 188/106 P |
| 5,024,298 A | * | 6/1991 | Schenk ................... F16D 65/18 188/346 |
| 5,894,094 A | | 4/1999 | Kuchler et al. |

(Continued)

FOREIGN PATENT DOCUMENTS

| DE | 1555162 A1 | 8/1970 |
| WO | 2008071550 A1 | 6/2008 |

*Primary Examiner* — Christopher P Schwartz
(74) *Attorney, Agent, or Firm* — Michael Best & Friedrich LLP

(57) ABSTRACT

A method and apparatus for sensing wheel torque of a highly automated driving (HAD) vehicle includes a wheel hub configured to rotate around a rotation axis as the vehicle moves and a brake caliper, including a brake pad, configured to apply a caliper force to the wheel hub. A reaction carriage is interconnected with the brake caliper and is configured to have a reaction force applied to it when the brake caliper applies the caliper force to the wheel hub. The wheel torque sensor includes a hydraulic chamber having a hydraulic fluid and a pressure sensor, interconnected with the hydraulic chamber, that senses pressure applied to the hydraulic fluid in response to the reaction force.

16 Claims, 9 Drawing Sheets

(56) References Cited

U.S. PATENT DOCUMENTS

| | | | |
|---|---|---|---|
| 6,036,285 A * | 3/2000 | Murphy | B60T 8/17616 |
| | | | 188/181 T |
| 7,104,616 B2 | 9/2006 | Zierolf | |
| 7,418,362 B2 | 8/2008 | Shiraishi | |
| 7,559,259 B2 | 7/2009 | Fruhwirth et al. | |
| 7,813,860 B2 * | 10/2010 | Horiuchi | B60T 8/52 |
| | | | 188/18 A |
| 8,075,066 B2 * | 12/2011 | Greer | B60T 8/4275 |
| | | | 188/72.3 |
| 8,162,111 B2 * | 4/2012 | Riefe | F16D 65/0006 |
| | | | 188/370 |
| 9,003,896 B2 | 4/2015 | Nold et al. | |
| 9,404,820 B2 | 8/2016 | Gutierrez Lopez et al. | |
| 2007/0045061 A1 | 3/2007 | Murayama | |
| 2008/0058162 A1 * | 3/2008 | Schmidt | B60T 8/4072 |
| | | | 477/184 |
| 2008/0160937 A1 | 7/2008 | Baker et al. | |
| 2010/0032249 A1 * | 2/2010 | Baumann | B60T 8/52 |
| | | | 188/72.2 |

* cited by examiner

WHEEL TORQUE SENSOR FOR HIGHLY AUTOMATED DRIVING VEHICLES

BACKGROUND

Embodiments relate to a wheel torque sensor for controlling highly automated driving vehicles.

Highly automated driving (HAD) vehicles require a virtual driver that is capable of compensating for variations in performance, such as braking, acceleration and steering. In non-HAD or human-driven vehicles, the human driver is responsible for sensing, thinking and acting to achieve the desired vehicular performance.

SUMMARY

One embodiment provides a wheel torque sensor system for a vehicle such as a highly automated driving (HAD) vehicle. The system includes a wheel hub configured to rotate around a rotation axis as the vehicle moves and a brake caliper, including a brake pad, configured to apply a caliper force to the wheel hub. A reaction carriage is interconnected with the brake caliper and is configured to receive a reaction force when the brake caliper applies the caliper force to the wheel hub. The reaction carriage moves in response to the reaction force. The wheel torque sensor includes a hydraulic chamber having a hydraulic fluid and a pressure sensor, configured to be in communication with the hydraulic chamber, that senses pressure applied to the hydraulic fluid in response to the reaction force. The pressure sensed by the pressure sensor is functionally related to the wheel torque.

Another embodiment provides a bidirectional wheel torque sensor for a vehicle, including a reaction carriage configured to be interconnected with a brake caliper of a vehicle disc brake. The reaction carriage has a first hydraulic chamber including a hydraulic fluid and a first pressure port or check valve interconnected with the first hydraulic chamber. The first pressure port is configured to open in response to the application of a reaction force to the reaction carriage in a first direction. As a result of the reaction force, pressure is applied to the hydraulic fluid in the first hydraulic chamber. The reaction carriage also includes a second hydraulic chamber spaced from the first hydraulic chamber. The second hydraulic chamber has a second pressure port or check valve that is configured to close as a result of the reaction force in an opposite second direction, when the wheel hub is rotating in a reverse direction. A hydraulic bypass line or passageway is configured to be in communication with the first hydraulic chamber and the second hydraulic chamber. A pressure line is in fluid flow communication with the first and second pressure ports. A pressure sensor is interconnected with a pressure line and senses the pressure of the hydraulic fluid resulting from the reaction force. The pressure sensed by the pressure sensor is functionally related to the wheel torque.

Another embodiment provides a method for sensing the torque of a rotating vehicle wheel that includes attaching a reaction carriage to a brake caliper of the vehicle and applying a caliper force to slow the speed of the vehicle. A reaction force is applied to the reaction carriage upon the application of the caliper force. A hydraulic fluid flows in a hydraulic chamber of the reaction carriage when the force is applied to the reaction carriage, and the hydraulic fluid flow is sensed as an indicator of wheel torque.

Other embodiments will become apparent by consideration of the detailed description and accompanying drawings.

DETAILED DESCRIPTION

Before any embodiments are explained in detail, it is to be understood that the embodiments are not limited in their application to the details of construction and the arrangement of components set forth in the following description or illustrated in the following drawings. Other embodiments are possible and embodiments are capable being practiced or of being carried out in various ways.

Also, it is to be understood that the phraseology and terminology used herein is for the purpose of description and should not be regarded as limiting. The use of "including," "comprising" or "having" and variations thereof herein is meant to encompass the items listed thereafter and equivalents thereof as well as additional items. The terms "mounted," "connected" and "coupled" are used broadly and encompass both direct and indirect mounting, connecting and coupling. Further, "connected" and "coupled" are not restricted to physical or mechanical connections or couplings, and can include electrical connections or couplings, whether direct or indirect. Also, electronic communications and notifications may be performed using any known means including wired connections, wireless connections, etc.

It should also be noted that a plurality of hardware and software based devices, as well as a plurality of different structural components may be used to implement the embodiments. In addition, it should be understood that embodiments may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic based aspects of the embodiments may be implemented in software (e.g., stored on non-transitory computer-readable medium) executable by one or more processors. As such, it should be noted that a plurality of hardware and software based devices, as well as a plurality of different structural components may be utilized to implement the embodiments. For example, "processing units" and "controllers" described in the specification can include standard processing components, such as one or more processors, one or more memory modules including non-transitory computer-readable medium, one or more input/output interfaces, and various connections (e.g., a system bus) connecting the components.

Figure 1:
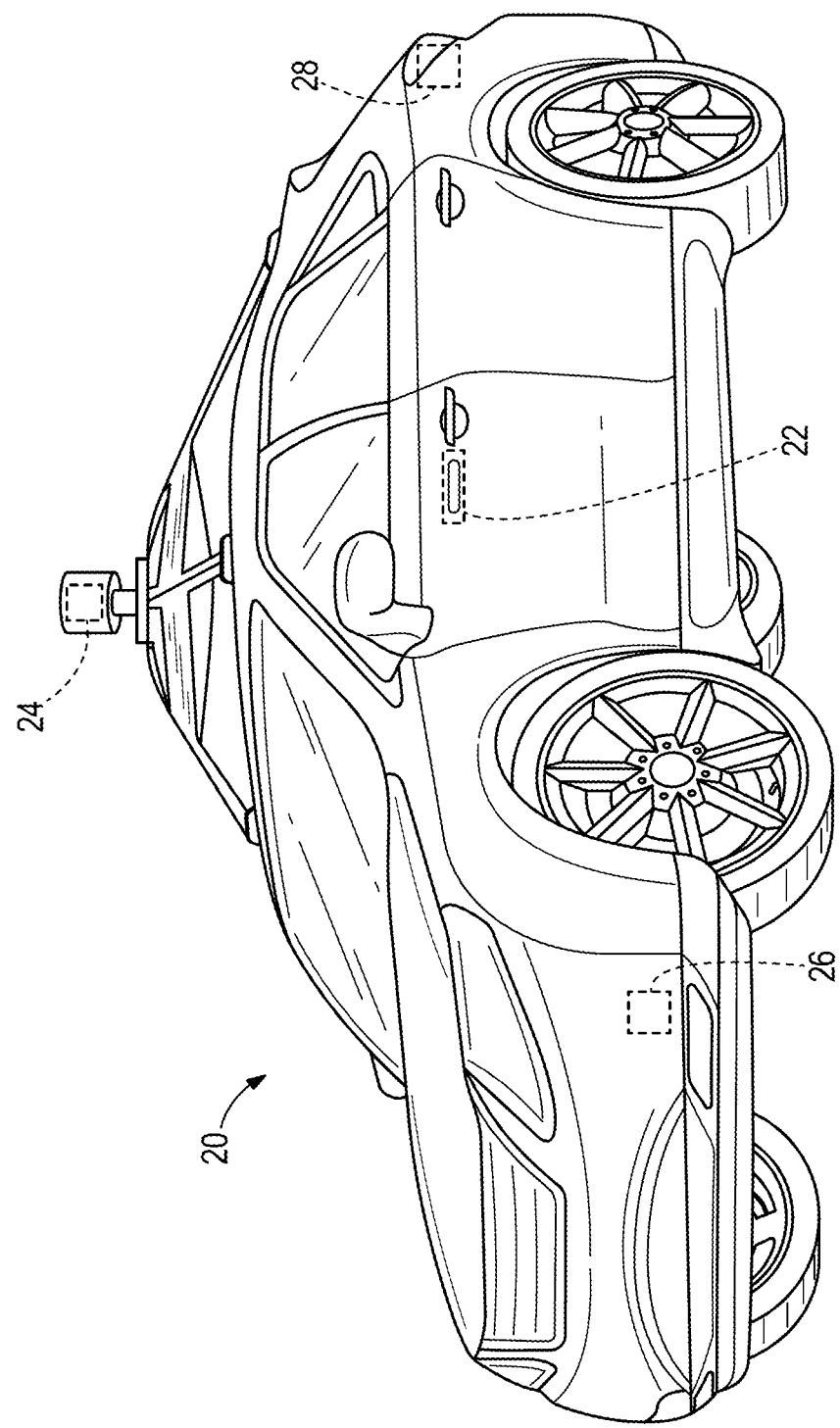
FIG. 1 is a perspective view of a highly automated driven (HAD) vehicle according to some embodiments.

FIG. 1 depicts a highly automated driving (HAD) vehicle 20 that includes a fingerprint sensor 22 mounted to the exterior of the vehicle 20 for detecting a fingerprint of a specific authorized individual. Thus, in one embodiment, preselected persons obtain access to the HAD vehicle 20. The HAD vehicle 20 includes a laser identification detection and ranging (Lidar) sensor 24 mounted at a top of a vehicle hood to locate objects in plural directions. Further, FIG. 1 shows a frontward directed radar sensor 26 and a rearward directed radar sensor 28. Additional sensors are not illustrated in FIG. 1.

Figure 2:
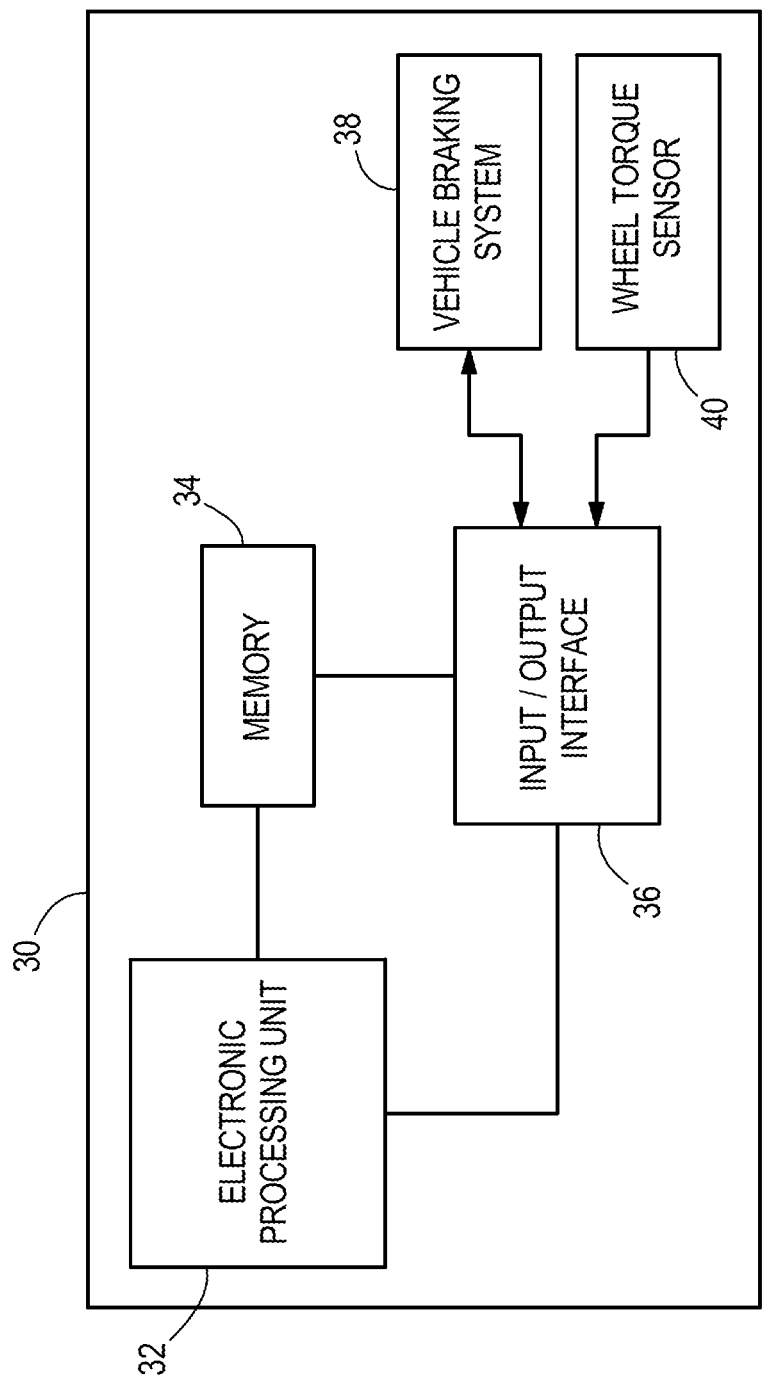
FIG. 2 is a block diagram of an electronic vehicle controller according to some embodiments.

As illustrated in FIG. 2, in one embodiment, the system controller 30 includes an electronic processing unit 32 (e.g. one or more microprocessors or other suitable programmable devices), a non-transitory memory 34 and an input/output interface 36. The input/output interface 36 shown in FIG. 2 receives inputs and outputs to and from controller 30, including vehicle braking system 38 and vehicle torque sensor 40. In one embodiment, the input/output interface 36 enables the electronic processing unit 32 to communicate with the various vehicular systems. The input/output interface 36 provides an electrical connection over a communication bus or over a wired, wireless, or optical connection that enables the vehicular systems, controllers, and devices to communicate using network communications protocols.

The non-transitory memory 34 can include a program storage area (e.g., read only memory (ROM)) and a data storage area (e.g., random access memory (RAM)), and another non-transitory computer readable medium. The electronic processing unit 32 executes software stored in the memory 34. The software may include instructions and algorithms for controlling a brake system and the wheel torque sensor as described herein.

Figure 3:
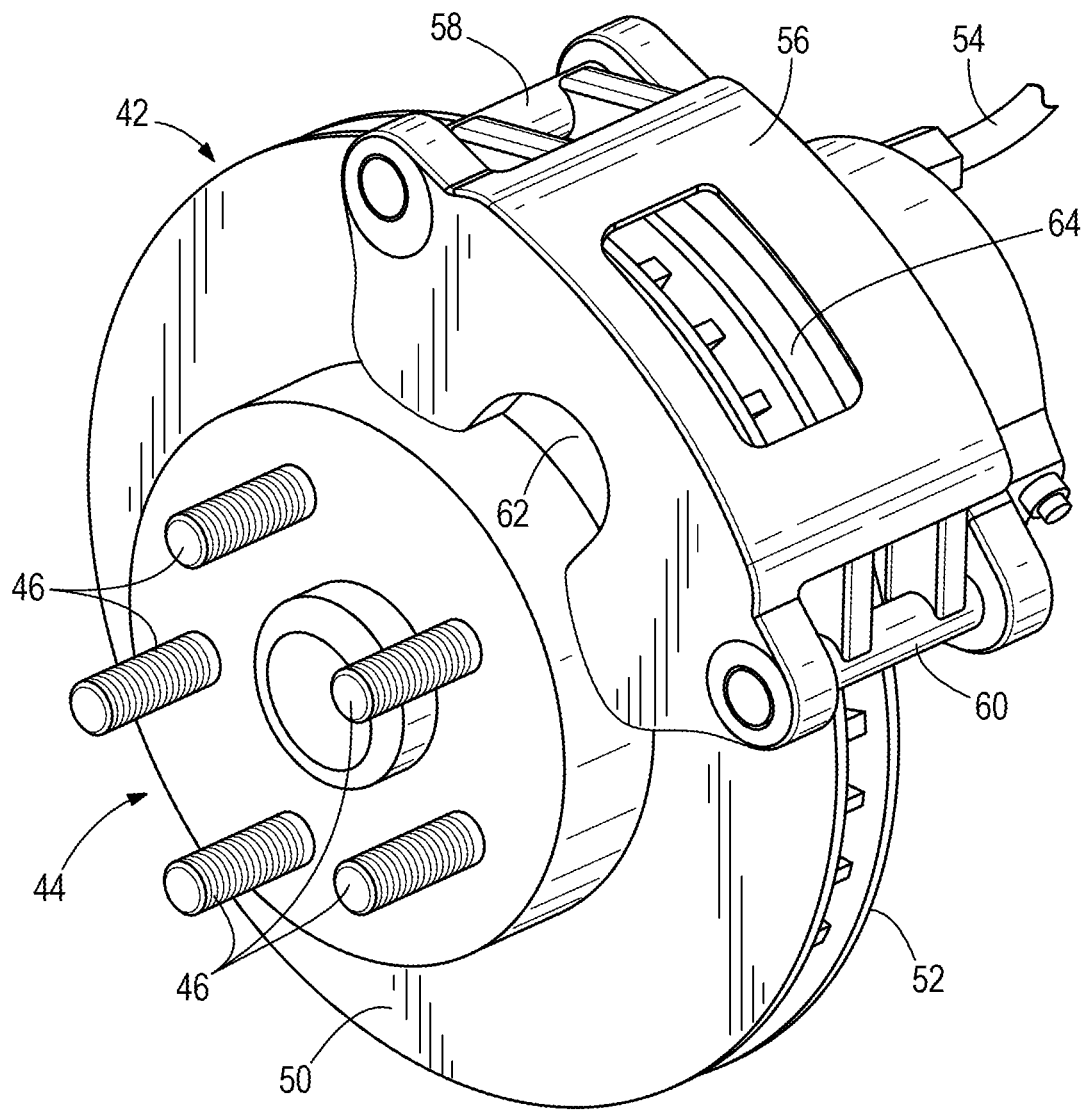
FIG. 3 is a plan view of a typical prior-art disc brake system.

As illustrated in FIG. 3, a typical prior art vehicular disc brake system 42 has a rotatable wheel hub 44. Wheel hub 44 includes a plurality of studs 46 used for mounting a tire. Wheel hub 44 also includes a rotatable disc or rotor 48 having a first rotor surface 50 and an opposed second rotor surface 52. A hydraulic line 54 is in fluid flow communication with a brake caliper 56 and is used to control the braking force applied to the wheel hub 44. Caliper 56 includes a pair of guide pins 58 and 60. Caliper 56 has a has one or more pistons (not shown) that force brake pad 62 and second brake pad 64 against their respective rotor surfaces 50 and 52 in response to a hydraulic pressure actuation signal on line 54.

Figure 4:
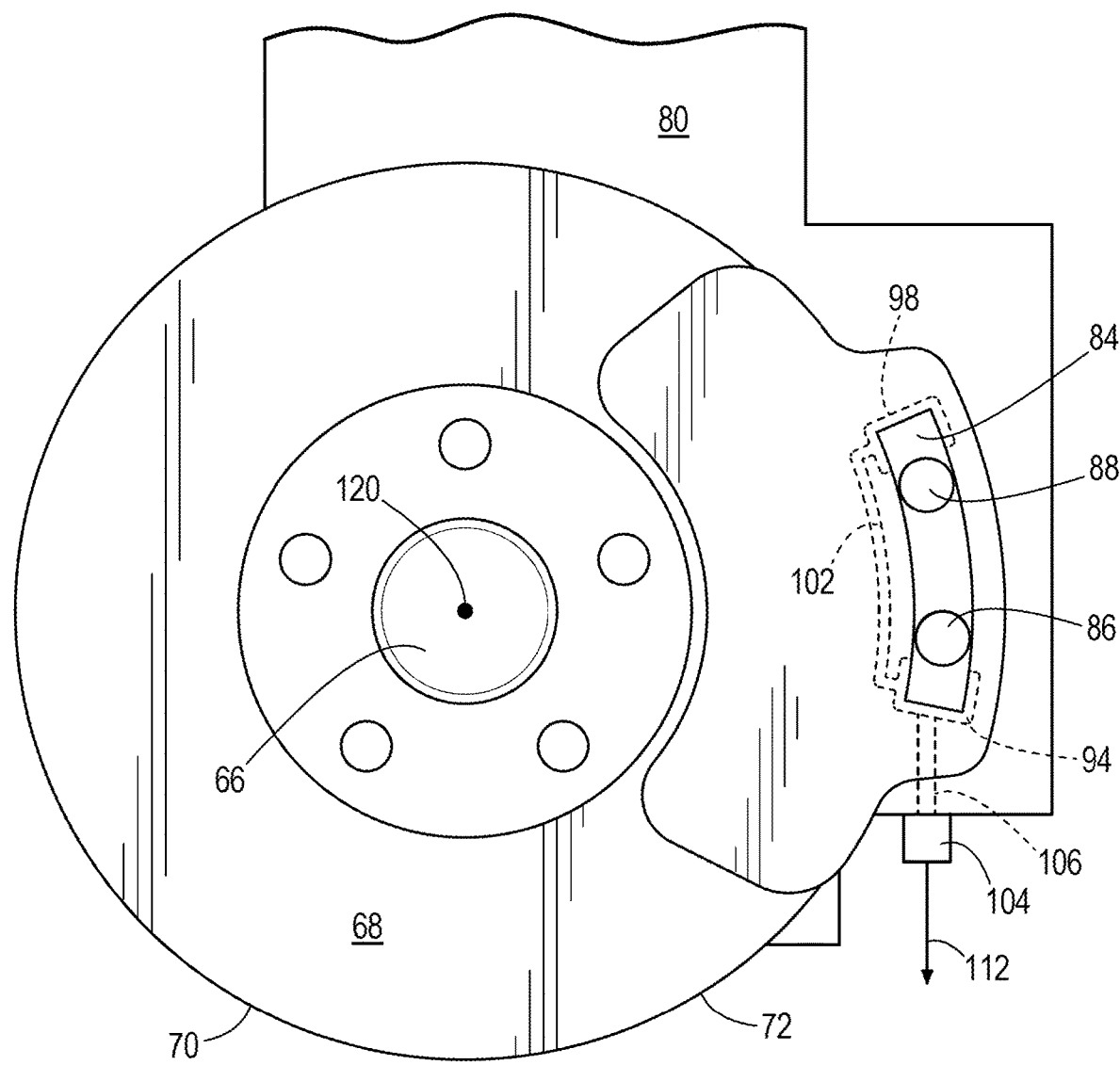
FIG. 4 is a plan view of a wheel torque sensor system incorporated into a vehicle disc brake according to other embodiments.

As illustrated in FIG. 4, rotatable wheel hub 66 of a vehicle disc brake system has a brake disc or rotor 68. Rotor 68 has first and second rotor surfaces 70 and 72 respectively. A caliper 74 has a first brake pad 76 affixed thereto and at least one piston 78 (see FIG. 6). Caliper 74 is affixed to a vehicle frame member 80 which is a component of the vehicle suspension system. When the caliper 74 receives a braking signal from the vehicle braking system 38, the caliper 74 actuates the caliper piston which in turn presses first brake pad 76 against rotor surface 70 in an axial direction normal to rotor 68 in order to slow the rotation of wheel hub 66 and vehicle speed. At the same time, the piston of caliper 74 forces a second brake pad 82 in an axial direction normal to and against a second rotor surface 72 disposed on the opposite side of rotor 68. Many vehicles have disc brakes for two wheels, while some vehicles have disc brakes for four wheels.

Figure 6:
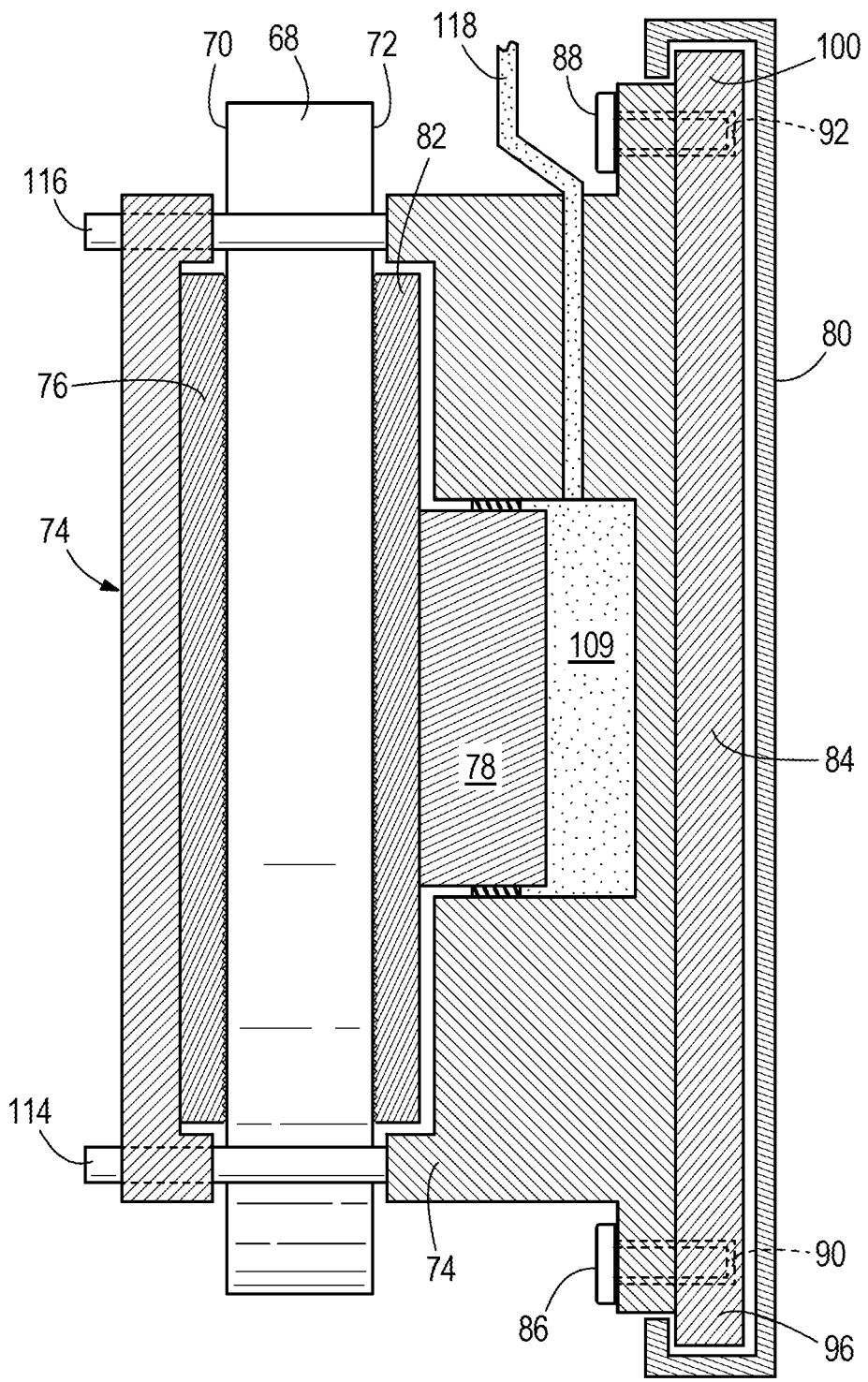
FIG. 6 is a side cross-sectional view of a disc brake-reaction carriage assembly according to some embodiments.

In FIG. 4, caliper 74 has a first mounting bolt 86 and a second mounting bolt 88 that are received in respective first aperture 90 and second aperture 92 formed in reaction carriage 84, as also shown in FIG. 6. Reaction carriage has a degree of freedom or the ability to move in the x-direction of rotor torque, as more fully explained below.

Figure 5:
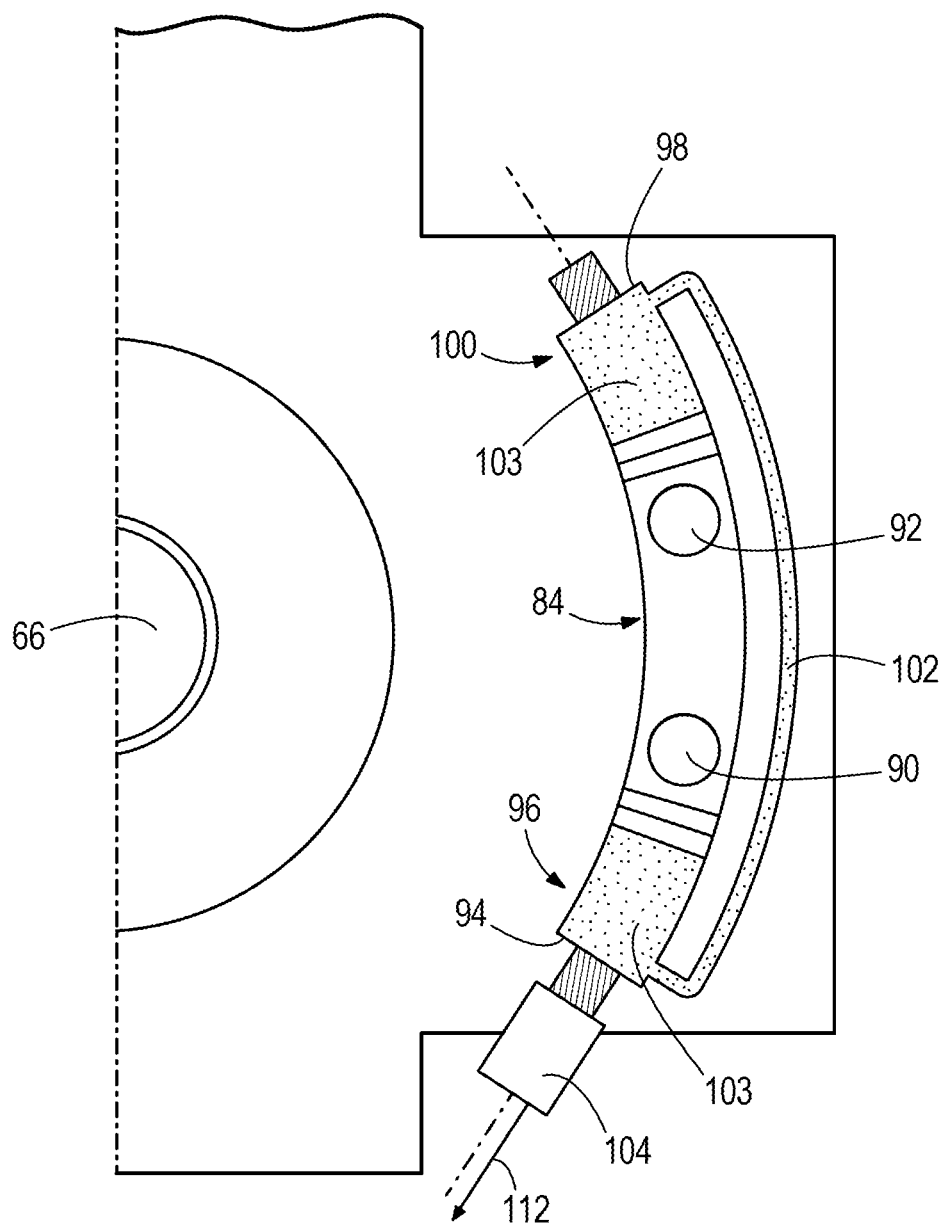
FIG. 5 is a detailed plan view of a reaction carriage according to some embodiments.

As illustrated in FIG. 5, reaction carriage 84 has an elongated shape in its longitudinal direction in some embodiments. The embodiment shown in FIG. 5 is a bidirectional reaction carriage 84 in that it enables wheel torque to be sensed in both the clockwise and counterclockwise directions of hub 66 rotation. In other embodiments, the reaction carriage is configured to sense wheel torque in a single direction corresponding to the forward direction of the vehicle.

In the embodiment shown in FIG. 5, reaction carriage 84 has a first hydraulic reservoir or chamber 94 near a first end 96 and a second hydraulic reservoir or chamber 98 near the opposite second end 100 of reaction carriage 84. A hydraulic bypass passageway 102 is in fluid flow communication with both hydraulic chambers 94 and 98. Hydraulic chambers 94 and 98 and bypass passageway 102 have a non-compressible hydraulic fluid 103 contained therein. A pressure sensor 104 and its sensor piston 106 are in fluid flow communication with first hydraulic chamber 94. First hydraulic chamber 94 has a first pressure port 108 (see FIG. 8) that operates like a first check valve which opens when the reaction force applied to reaction carriage 84 is in a first direction, and closes when the reaction force is not applied or is applied in an opposite direction. Similarly, second hydraulic chamber 98 has a second pressure port 110 (see FIG. 8) that operates like a second check valve which opens in response to movement of the reaction carriage 84 in an opposite second direction upon wheel hub rotation in a reverse direction. The second pressure port 110 closes when the reaction force is not applied or is applied in the first direction to the reaction carriage 84. The use of two hydraulic chambers 94 and 98 enables wheel torque to be sensed when the wheel hub rotates in either the forward or reverse direction. In some bidirectional embodiments, the direction of wheel torque is determined from the direction of wheel speed sensors. In some embodiments, a single hydraulic chamber is used when wheel torque is sensed in a single (i.e. forward) direction of wheel hub rotation.

FIG. 6 is a side cross-sectional view according to some embodiments. In FIG. 6, caliper 74 is disposed about brake rotor 68. First brake pad 76 is interconnected with caliper 74 and is configured to engage first rotor surface 70. Second brake pad 82 is interconnected with caliper 74 and is configured to engage second rotor surface 72. First and second guide pins 114 and 116 guide the caliper 74 as it is squeezed. Caliper piston 78 causes first brake pad 76 and second brake pad 82 to be pressed against their respective first rotor surface 70 and second rotor surface 72 in response to a brake actuation pressure on line 118.

As shown in FIG. 6, caliper 74 is bolted to reaction carriage 84 by first mounting bolt 86 and second mounting bolt 88, which are received by respective first aperture 90 and second aperture 92 in reaction carriage 84. Reaction carriage 84 is retained by frame member 80.

Figure 7:
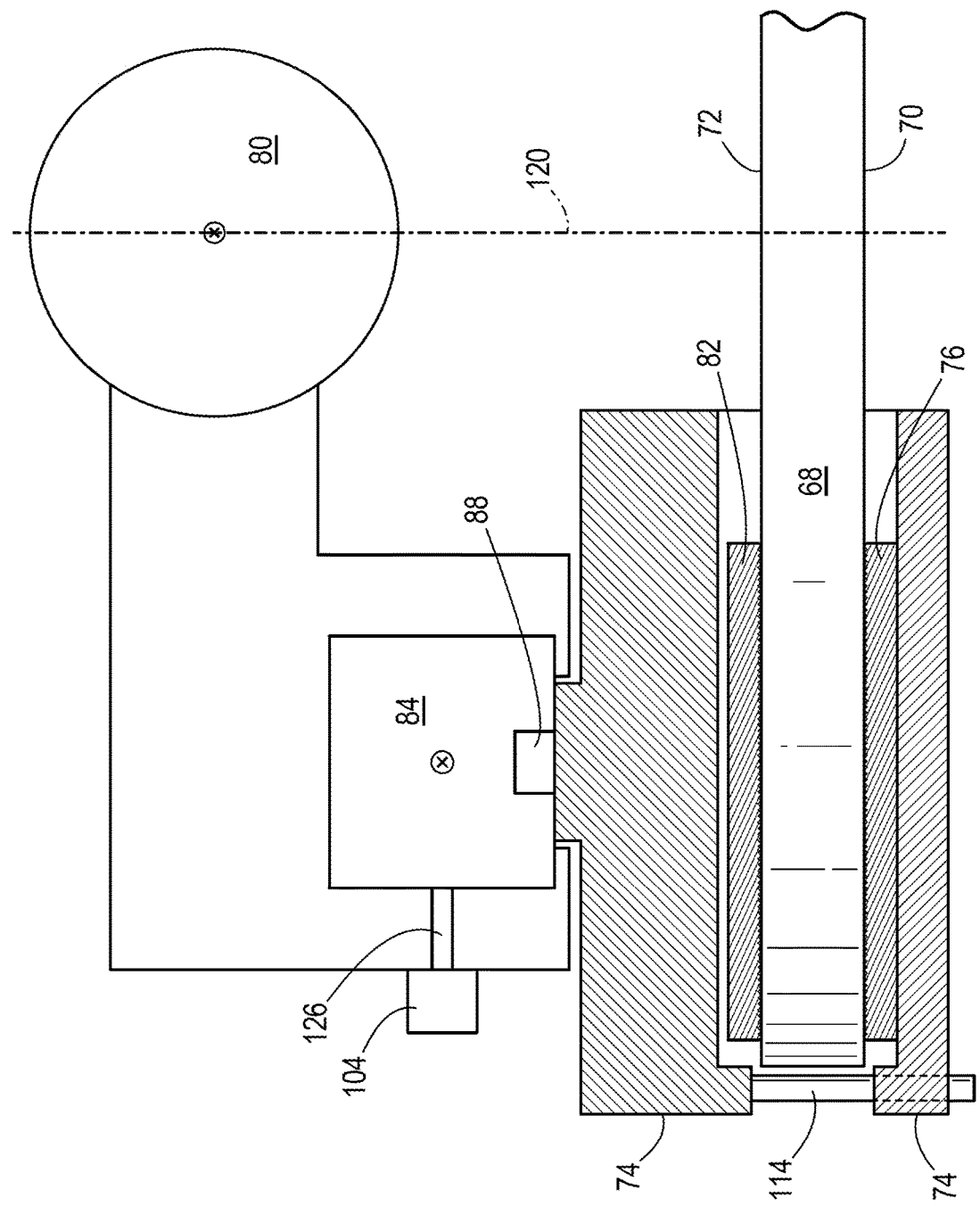
FIG. 7 is an end view of a disc brake-reaction carriage assembly according to some embodiments.

FIG. 7 is an end view of a disc brake—reaction carriage assembly according to some embodiments. FIG. 7 illustrates the orientations of frame member 80 and reaction carriage 84 that is retained by frame member 80. In some embodiments, reaction carriage 84 may be affixed to an adapter plate, which in turn is connected to a vehicle frame member. In some embodiments, the vehicle frame member is part of the vehicle suspension system. Caliper assembly 74 is affixed to reaction carriage 84 by mounting bolt 86. First brake pad 76 and second brake pad 82 are disposed on opposite sides of rotor 68. Rotor 68 rotates around axis 120. The direction of rotor rotation determines the direction of the reaction force and the displacement direction of reaction carriage 84. The caliper force applied to rotor 68 determines the magnitude of the reaction force and the amount of reaction carriage displacement.

Figure 8:
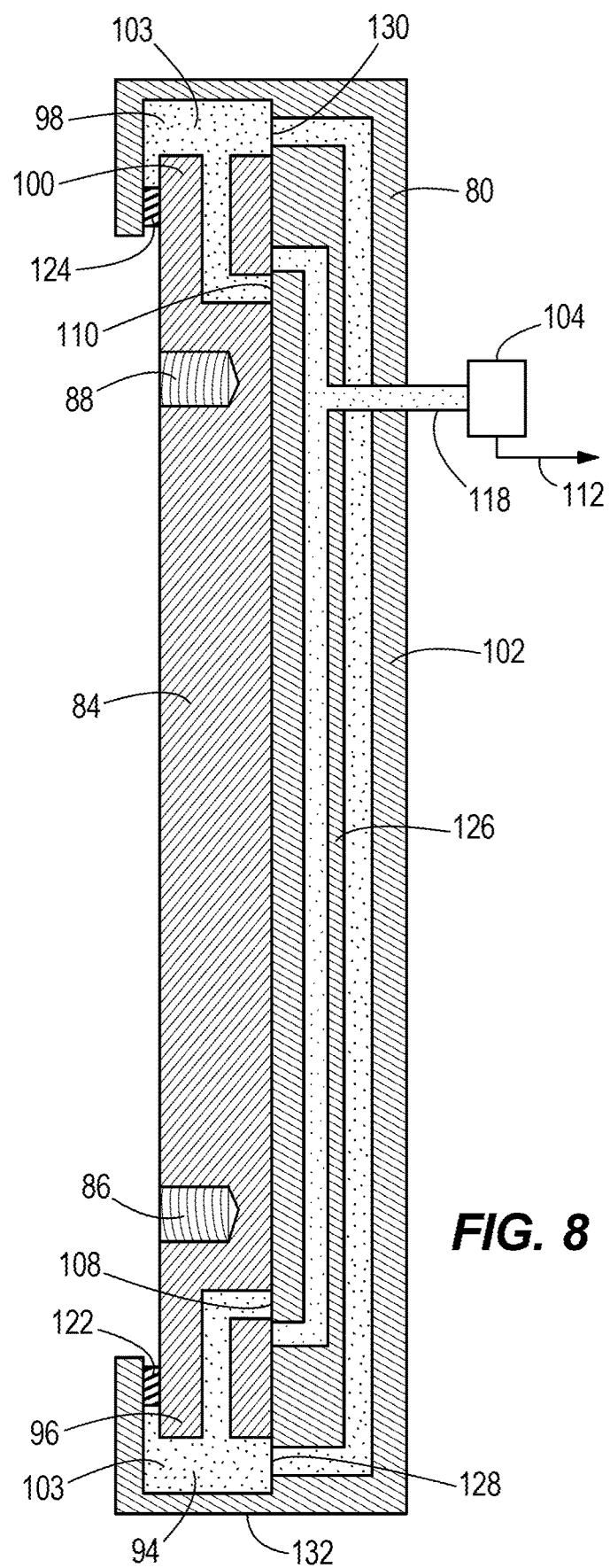
FIG. 8 is a side cross-sectional view of a reaction carriage according to some embodiments.
Figure 9:
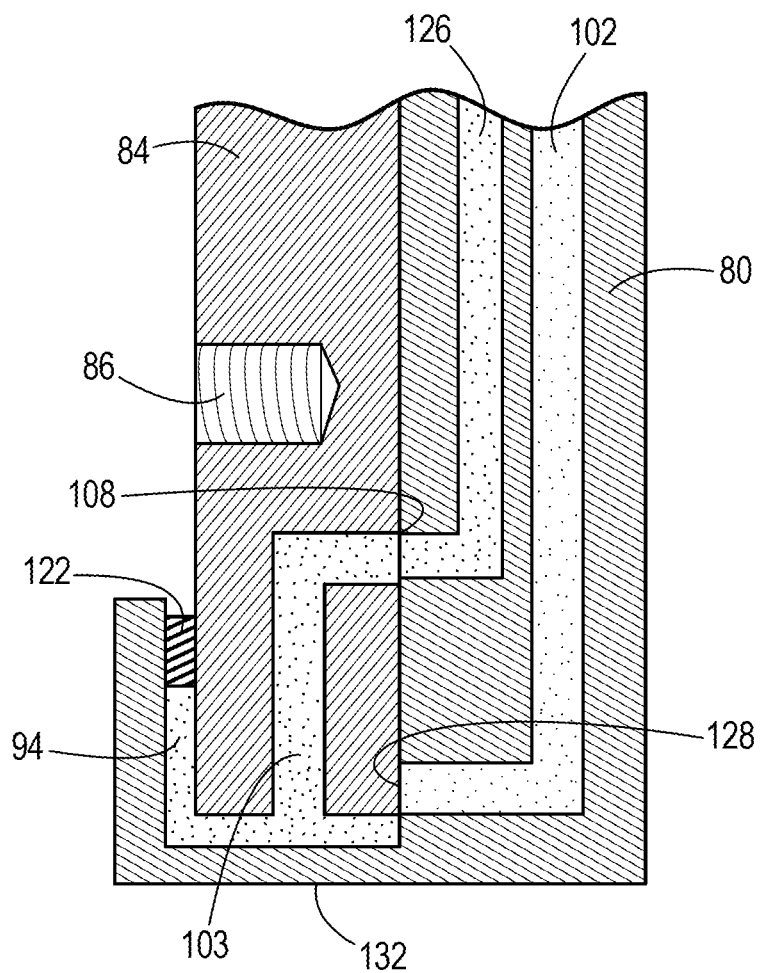
FIG. 9 is a side cross-sectional view of one end of a reaction carriage according to some embodiments.

FIGS. 8 and 9 depict the reaction carriage 84 according to some embodiments. The reaction carriage depicted in FIG. 8 is bidirectional in that it can sense wheel torque when the wheel rotates in both a forward direction and a reverse direction. In other embodiments, the reaction carriage has a single hydraulic chamber so that wheel torque is sensed in only a single direction.

FIG. 8 depicts the reaction carriage 84 in a neutral position, when no reaction force is being applied and no wheel torque is being sensed. FIG. 8 represents a normal non-braking or driving condition of the vehicle. As shown in FIG. 8, first and second pressure seals 122 and 124 seal chambers 94 and 98 respectively. In FIG. 8, first pressure port 108 and second pressure port 110 are both closed so that no pressure signal is communicated on pressure line 126 to pressure sensor 104. Instead, both first bypass port 128 and second bypass port 130 are open so that first chamber 94 and second chamber 98 are in fluid flow communication with bypass passageway 102.

FIG. 9 depicts the position of reaction carriage 84 when braking of the vehicle is occurring. As shown in FIG. 9, the reaction carriage 84 has been displaced or moved in response to the reaction force applied to it. Reaction carriage 84 has moved along its longitudinal direction, toward lateral portion 132 of frame member 80, thereby opening first port 108. At the same time, bypass port 128 is closed. As a result, reaction carriage applies a force to the hydraulic fluid 103 in chamber 94, creating a pressure signal in pressure line 126 that is sensed by pressure sensor 104 (see FIG. 8). This sensed pressure is functionally related to the magnitude of wheel torque, and is communicated to the control electronics 30 (FIG. 2) via line 112 (FIG. 5). When the reaction carriage is in the position shown in FIG. 9, second pressure port 110 (FIG. 8) and second bypass port 130 are closed.

In some embodiments in which the reaction carriage is bidirectional as shown in FIG. 8, the wheel torque sensing system operates in a similar but reverse manner when the wheel hub 66 is rotating in a reverse direction. In that instance, reaction carriage 84 is displaced away from lateral portion 132. Second pressure port 110 is open and second bypass port 130 is closed. As a result, reaction carriage applies a force to hydraulic chamber 98. The magnitude of the pressure signal in pressure line 126 is sensed by pressure sensor 104 and communicated to control electronics 30 via line 112.

In both unidirectional and bidirectional embodiments, the signal on line 112 is used by the control electronics to control the performance of the highly automated driving (HAD) vehicle or other vehicle. In this way, the wheel torque is directly measured as a function of brake caliper force. The wheel torque is used in a feedback loop to determine how much additional brake force is required to slow the vehicle and control vehicle performance. The wheel torque sensor is integrated with the vehicle braking system to reduce cost and complexity of the wheel torque sensing system.

Thus, the embodiments provide, among other things, a method and apparatus for controlling performance of a highly automated driving vehicle 20 by incorporating a wheel torque sensor into a vehicle disc brake system.

Various features and advantages are set forth in the following claims.

What is claimed is:

1. A wheel torque sensor system for a vehicle, comprising:
   a wheel hub configured to rotate around a rotation axis as the vehicle moves;
   a brake caliper, including a brake pad, configured to apply a caliper force to the wheel hub;
   a reaction carriage interconnected with the brake caliper and configured to have a reaction force applied thereto when the brake caliper applies the caliper force to the wheel hub;
   a vehicle frame member that retains the reaction carriage;
   a hydraulic chamber including a hydraulic fluid; and
   a pressure sensor, configured to be in communication with the hydraulic chamber, that senses pressure applied to the hydraulic fluid in response to the reaction force moving the reaction carriage relative to the vehicle frame member.

2. The wheel torque sensor system of claim 1, wherein the pressure sensor has an elongated shape.

3. The wheel torque sensor system of claim 1, wherein the hydraulic chamber is disposed between the vehicle frame member and the reaction carriage.

4. The wheel torque sensor system of claim 1, further including:
   a hydraulic pressure line;
   a first pressure port interconnected with the first hydraulic chamber, the first pressure port configured
      to open when the hydraulic fluid flows in a first direction in the pressure line, and
      to close when the hydraulic fluid flows in a second direction in the pressure line;
   a second hydraulic chamber spaced from the first hydraulic chamber and having hydraulic fluid, the second hydraulic chamber having a second pressure port, the second port configured
      to open when the hydraulic fluid flows in the second direction in the pressure line, and
      to close when the hydraulic fluid flows in the first direction in the pressure line; and
   a hydraulic bypass passageway configured to be in communication with the first hydraulic chamber and the second hydraulic chamber when no reaction force is applied.

5. The wheel torque sensor system of claim 1, further including:
   a first mounting bolt and a second mounting bolt that affix the caliper to the reaction carriage.

6. The wheel torque sensor system of claim 1, wherein the reaction carriage is configured to be movable relative to the vehicle frame member in response to torque of the wheel hub.

7. The wheel torque sensor system of claim 1, wherein the caliper includes at least one piston that moves the brake pad against the wheel hub.

8. The wheel torque sensor system of claim 1, wherein the reaction carriage is moved along its longitudinal direction, toward a lateral portion of the vehicle frame member to open a port for the flowing of the hydraulic fluid.

9. A bidirectional wheel torque sensor for a vehicle, comprising:
- a reaction carriage configured to be interconnected with a brake caliper of a vehicle disc brake;
- a first hydraulic chamber including a hydraulic fluid;
- a first pressure port interconnected with the first hydraulic chamber, the first pressure port configured
  - to open when the hydraulic fluid flows in a first direction, and
  - to close when the hydraulic fluid flows in a second direction;
- a second hydraulic chamber spaced from the first hydraulic chamber, the second hydraulic chamber having a second pressure port, the second pressure port configured
  - to open when the hydraulic fluid flows in the second direction, and
  - to close when the hydraulic fluid flows in the first direction;
- a hydraulic bypass passageway configured to be in communication with the first hydraulic chamber and the second hydraulic chamber;
- a pressure sensor, configured to be in communication with the first hydraulic chamber and the second hydraulic chamber, that senses pressure applied to the hydraulic fluid; and
- a vehicle frame member, interconnected with a vehicle frame, that retains the reaction carriage,
- wherein the pressure sensor senses the pressure applied to the hydraulic fluid when the reaction force moves the reaction carriage relative to the vehicle frame member.

10. The bidirectional wheel torque sensor of claim 9, wherein the reaction carriage has an elongated shape.

11. The bidirectional wheel torque sensor of claim 9, Wherein the first hydraulic chamber is disposed between the vehicle frame member and the reaction carriage.

12. The bidirectional wheel torque sensor of claim 9, wherein the reaction carriage further includes:
- a first aperture and a second aperture configured to receive a first mounting bolt and a second mounting bolt respectively that affix the caliper to the reaction carriage.

13. A method for sensing the torque of a rotating vehicle wheel hub, comprising:
- affixing a reaction carriage to a brake caliper of the vehicle and retaining the reaction carriage with a vehicle frame member;
- applying a caliper force to the wheel hub to slow the speed of the vehicle;
- applying a reaction force to move the reaction carriage relative to the vehicle frame member upon the application of the caliper force;
- flowing a hydraulic fluid in a pressure line when the reaction force is applied to the reaction carriage; and
- sensing the hydraulic fluid flow as an indicator of wheel torque.

14. The method of claim 13, further including
- flowing the hydraulic fluid in the pressure line in a second direction when the vehicle wheel rotates in a reverse direction.

15. The method of claim 13, wherein the hydraulic fluid in the pressure line is provided from a hydraulic chamber disposed between the vehicle frame member and the reaction carriage.

16. The method of claim 13, wherein the reaction carriage is moved along its longitudinal direction, toward a lateral portion of the vehicle frame member to open a port for the flowing of the hydraulic fluid.

* * * * *